US007182016B2

(12) United States Patent
Forrest

(10) Patent No.: US 7,182,016 B2
(45) Date of Patent: Feb. 27, 2007

(54) HIGH PRESSURE FLUID CYLINDER SYSTEM

(75) Inventor: Jamie A. Forrest, Fenton, MI (US)

(73) Assignee: NLB Corp., Wixom, MI (US)

( * ) Notice: Subject to any disclaimer, the term of this patent is extended or adjusted under 35 U.S.C. 154(b) by 96 days.

(21) Appl. No.: 10/811,630

(22) Filed: Mar. 29, 2004

(65) Prior Publication Data

US 2004/0178285 A1 Sep. 16, 2004

Related U.S. Application Data

(63) Continuation of application No. 10/025,326, filed on Dec. 19, 2001, now Pat. No. 6,886,832.

(60) Provisional application No. 60/257,795, filed on Dec. 22, 2000.

(51) Int. Cl.
*F16J 10/04* (2006.01)
*F16J 15/18* (2006.01)

(52) U.S. Cl. .................................... 92/171.1; 92/168

(58) Field of Classification Search ............... 92/171.1, 92/168

See application file for complete search history.

(56) References Cited

U.S. PATENT DOCUMENTS

| | | | | |
|---|---|---|---|---|
| 4,878,815 | A * | 11/1989 | Stachowiak | 417/454 |
| 5,033,940 | A * | 7/1991 | Baumann | 92/170.1 |
| 5,636,975 | A * | 6/1997 | Tiffany et al. | 137/454.4 |
| 5,765,465 | A * | 6/1998 | Gardin et al. | 92/171.1 |
| 6,491,882 | B1 * | 12/2002 | Van Den Berg et al. | 92/169.2 |
| 6,886,832 | B2 * | 5/2005 | Forrest | 277/375 |

* cited by examiner

*Primary Examiner*—F. Daniel Lopez
(74) *Attorney, Agent, or Firm*—Carlson, Gaskey & Olds

(57) ABSTRACT

A high pressure fluid jetting system generally includes a fluid cylinder pump, a drive assembly, a pressurized liquid supply and an applicator gun. The drive assembly includes a diesel or electric powered motor which drives a rotatable drive shaft. The drive shaft drives a triple plunger which are reciprocally driven. The plungers communicate fluid from the supply to the gun to selectively jet water from the gun at a pressure of approximately 50,000 psi and 10.0 gallons per minute.

12 Claims, 5 Drawing Sheets

Fig-3
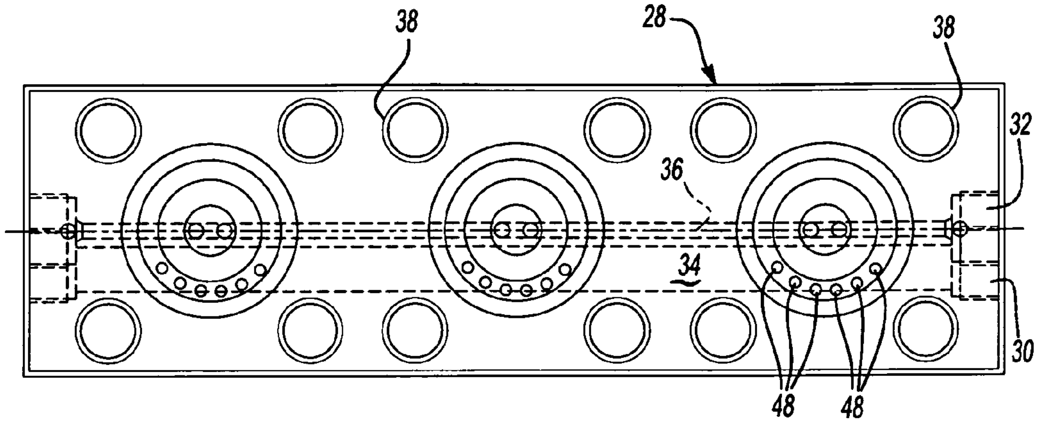
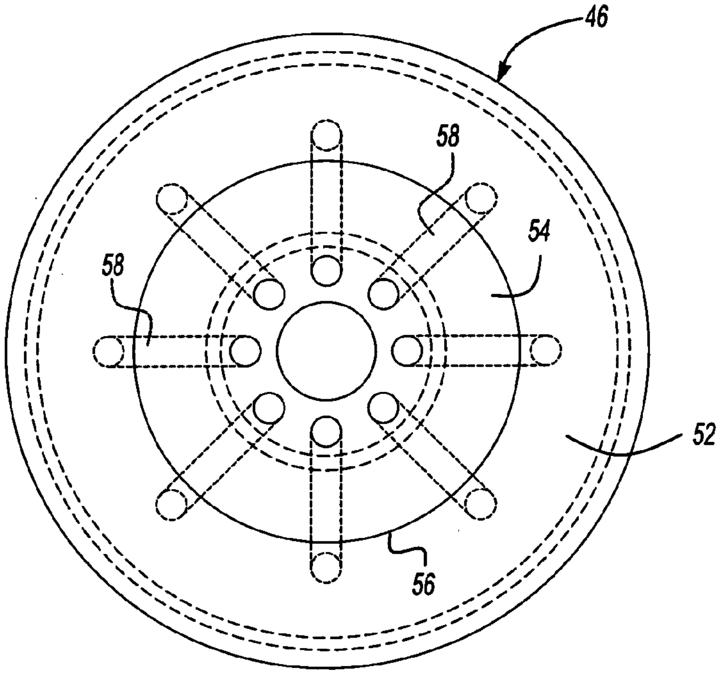
Fig-4

HIGH PRESSURE FLUID CYLINDER SYSTEM

The present application claims priority to U.S. Provisional Patent Application Ser. No. 60/257,795, filed 22 Dec. 2000.

The present application is a continuation of U.S. patent application Ser. No. 10/025,326, filed Dec. 19, 2001 now U.S. Pat. No. 6,886,832.

BACKGROUND OF THE INVENTION

The present invention relates to a high pressure fluid cylinder, and more particularly to a multiple of interference fit components which provide dependable operation of a fluid cylinder at approximately 50,000 psi and 10 gpm.

Systems which perform water jetting operations such as surface preparation, cutting cleaning, coating removal and other operations are known. The systems typically use a fluid cylinder having reciprocating plungers to force the fluid out of an applicator at extremely high pressure. As the plungers reciprocate within the fluid cylinder, the fluid cylinder and components thereof cycle between atmospheric and maximum system pressure.

It is desirable to increase the operating pressure of the systems so that the various operations can be performed more efficiently. However, due in part to the cyclical operation between high and low pressure, the system components undergo extreme stresses. The life span of the components may be reduced as in relation to the increase in system pressure.

Accordingly, it is desirable to provide an extremely high pressure fluid cylinder in a compact highly portable package which will consistently operate over prolonged periods of time. It is further desirable to provide replaceable components which are long-lasting while providing consistent high pressure operating.

SUMMARY OF THE INVENTION

The present invention provides a high pressure fluid jetting system which generally includes a fluid cylinder pump, a drive assembly, a pressurized liquid supply and an applicator gun. The fluid cylinder pump operates to selectively jet water from the gun.

The drive assembly includes a diesel or electric powered motor which drives a rotatable drive shaft. The drive shaft drives a triple plunger which are reciprocally driven. The plungers communicate fluid from the supply to the gun, such that the fluid is discharged from the nozzle at a pressure of approximately 50,000 psi.

A plunger is stroked every 120 degree turn of a crank within the power frame (i.e., when number 1 is on the discharge stroke, number 3 is on the suction stroke and number 2 is in-between). Once a plunger reaches its full outward position, its fluid pumping chamber is filled with fluid and a suction valve checks closed under the bias of spring. The plunger is driven into a fluid pumping chamber. The plunger begins to displace volume within the fluid pumping chamber and the fluid is forced into a smaller and smaller area. The pressure within the pump thereby begins to increase and the pressure is carried by the components out to the frame plates. The plungers continue reciprocating into the fluid pumping chambers until each plunger reaches a full disclosure position.

When the pressure within the fluid pumping chambers reaches a predetermined pressure, a discharge valve overcomes a discharge spring and water pressure within the discharge passage. The discharge valve is of relatively light weight and includes a multiple of wing guides which reduce the likelihood of cocking as fluid exits the fluid pumping chambers and enters the manifold. The fluid exits through the discharge passage and the discharge port and travels out to the gun.

The plunger then reciprocates out of the fluid pumping chamber and the cycle repeats. Accordingly, an extremely high pressure fluid assembly is provided in a compact package.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 3 is an exploded view of a manifold of the fluid cylinder pump illustrated in FIG. 2;

FIG. 4 is an exploded view of a valve seat assembly of the fluid cylinder pump illustrated in FIG. 2;

DETAILED DESCRIPTION OF THE PREFERRED EMBODIMENT

Figure 1:
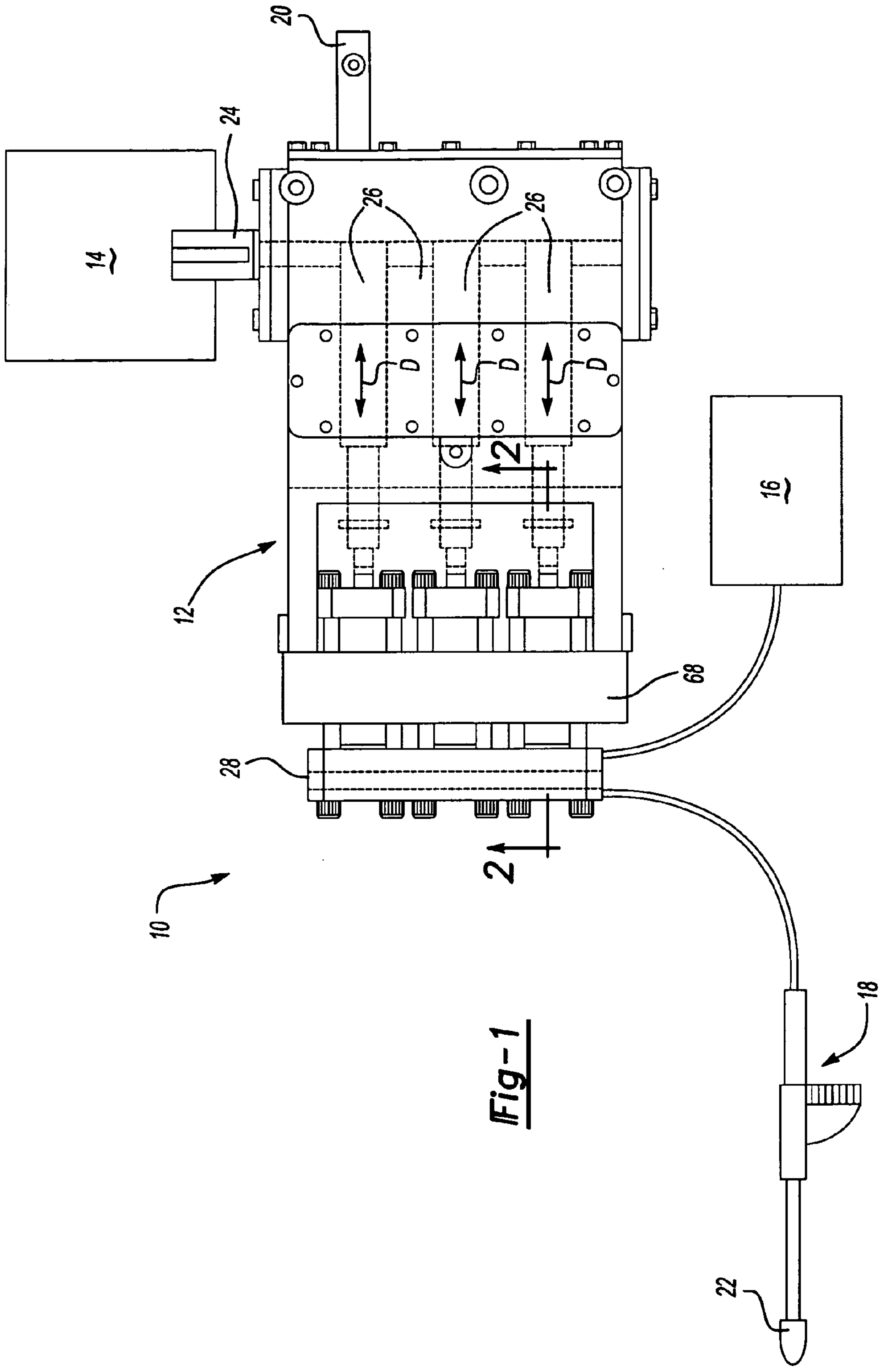
FIG. 1 is a partial schematic view of a high pressure fluid jetting system according to the present invention.

FIG. 1 illustrates a high pressure fluid jetting system 10. The system 10 generally includes a fluid cylinder pump 12, a drive assembly 14, a pressurized liquid supply 16 and an applicator gun 18. Preferably, the fluid cylinder pump 12 operates to selectively jet water from the gun 18 at a pressure of approximately 50,000 psi and 10.0 gallons per minute. A by-pass valve 20 provides for fine-tuning of the system pressure.

The drive assembly 14 includes a diesel or electric powered motor which drives a rotatable drive shaft 24. Drive shaft 24 drives a triple plungers 26 which are reciprocally driven in the direction of doubled headed arrows D. Plungers 26 communicate fluid from the supply 16 to the gun 18, such that the fluid is discharged form the nozzle 22 at a pressure of approximately 50,000 psi. As the nozzle 22 of the gun 18 wears, by pass valve 20 may be adjusted automatically or manually such that the fluid pressure is maintained at approximately 50,000 psi. The 50,000 psi pressure is produced by the flow displacement of the fluid within the pump 12 which is then restricted by the nozzle 22. In other words, Without nozzle 22, the fluid would be driven from gun 18 at a relatively low velocity.

Figure 2:
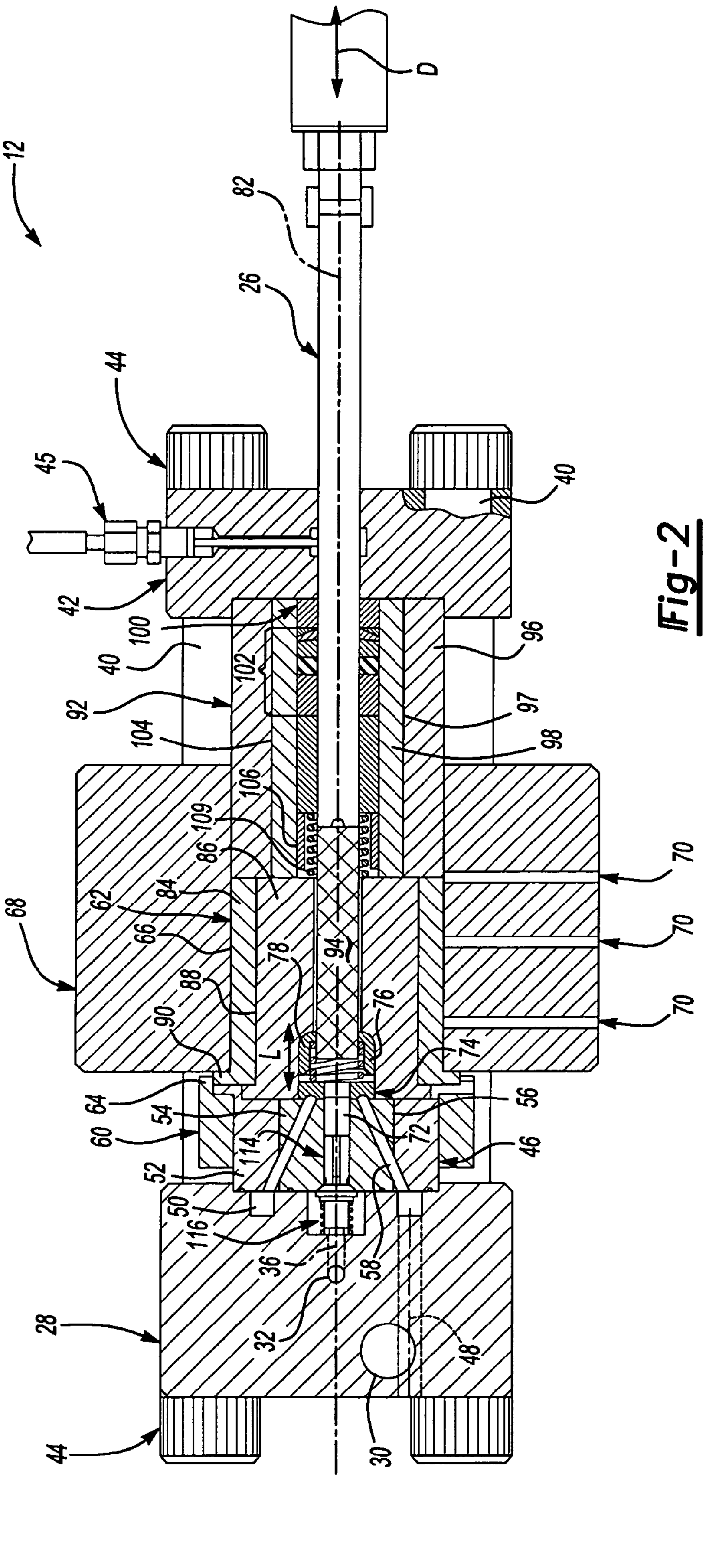
FIG. 2 is a sectional view of the fluid cylinder pump of FIG. 1.

Referring to FIG. 2, a sectional view of the pump 12 is illustrated. A manifold 28 includes a suction port 30 and a discharge port 32. The suction port 30 and the discharge port 32 lead to a rifle-drilled suction passage 34 and a rifle-drilled discharge passage 36 respectively (FIG. 3). Preferably, the suction bore 34 is sized to reduce the amount of turbulence and maintain the fluid flow below approximately 2 feet per second. The relatively slow speed insures that only low acceleration forces are required to bring the fluid from supply 16 (FIG. 1) up to speed. Further, the low fluid flow velocity provides a reduction in the corresponding pressure drop created by the potential energy transferred from the fluid pressure to the kinetic energy from the plungers 26,which accelerate the fluid.

Each of a multiple of bolt apertures 38 (FIG. 3) receive a socket head cap screw 40. The cap screw 40 pass through apertures 38 in the manifold 28 and apertures 38 in a flange plate 42 at the opposite end of the pump 12. The cap screws then fasten to the frame plate 42 with precise torque 40 to maintain the pump 12 in an assembled condition and provide structural support therefore. A lubrication assembly 45 preferably passes through the flange plate 42 to provide a lubricant to the plungers 26.

As the plunger 26 is retracted away from the manifold 28 (to the right in FIG. 2) (plunger illustrated in the full extended discharge position), fluid flows from the suction passage 34 in the manifold 28 through a series of manifold apertures 48 (also illustrated in FIG. 3) and into an annular passage 50. Importantly, it should be understood that the plunger 26 does not draw fluid into the pump 12 but allows fluid to flow into the pump 12 from the pressurized supply 16 (FIG. 1).

From the annular passage 50, the fluid enters a valve seat assembly 46. The valve seat assembly 46 includes an outer valve seat 52 and an inner valve seat 54. Preferably, an outer surface of the inner valve seat 54 and the inner surface of the outer valve seat 52 form an interference surface 56. Preferably, when assembled, the inner valve seat 54 is maintained in internal compressive stress. Interference surface 56 is angled at a very small angle opposite a multiple of angled valve seat intake passages 58 (also illustrated in FIG. 4) and relative to a pump centerline 82. The angled valve seat intake passages 58 are preferably of the largest diameter possible but are also preferably limited in diameter to the maximum diameter of the suction passages.

An alignment ring 60 aligns the valve seat assembly 46 with a pressure sleeve assembly 62. The alignment ring 60 includes a flange 64 which engages the outer diameter of the pressure sleeve assembly 62. The pressure sleeve assembly 62 engages an inner bore 66 of a frame plate 68 (also shown in FIG. 1). The frame plate 68 preferably includes a multiple of weep apertures 70 to provide predefined pressure relief points which assure a safe failure divert direction for the fluid.

Figure 5:
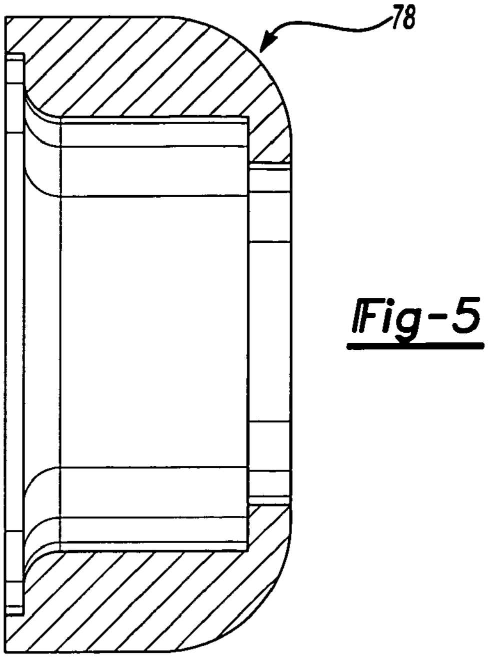
FIG. 5 is an exploded view of a valve stop of the fluid cylinder pump illustrated in FIG. 2.
Figure 6A:
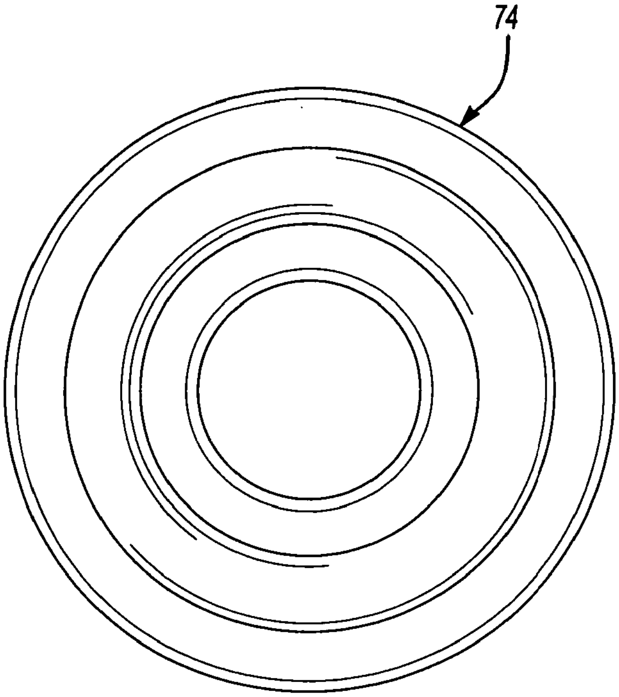
FIG. 6A is a front exploded view of a suction valve of the fluid cylinder pump illustrated in FIG. 2.
Figure 6B:
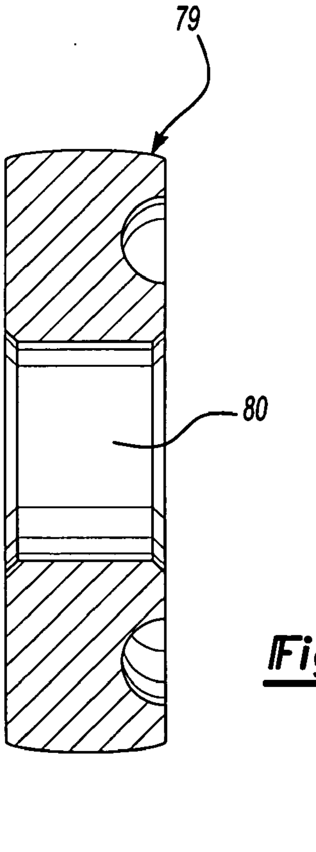
FIG. 6B is a side exploded view of a suction valve of the fluid cylinder pump illustrated in FIG. 2.

From the angled valve seat intake passages 58, the fluid progresses toward valve area 72 in the pressure sleeve assembly 62. To facilitate the fluid entering the valve area 72, a suction valve 74 is opened (moves toward the right of double headed arrow L in FIG. 2) against the force of valve spring 76. Valve stop 78 (FIG. 5) limits opening of the suction valve 74. A valve aperture 80 (FIG. 6) through valve 74 is preferably sized to minimize the flow velocity of the fluid entering the pump 12. The valve spring 76 is preferably machined on each end to assure that the valve 74 opens perpendicular to the pump centerline 82. Further, the valve spring 76 provides a biasing force that matches the cracking pressure of the valve 74. The cracking pressure is a function of the water pressure and sealing area of the valve.

The pressure sleeve assembly 62 includes an outer pressure sleeve 84 and an inner pressure sleeve 86. Preferably, an outer surface of the inner pressure sleeve 86 and the inner surface of the outer pressure sleeve 84 form an angled interference surface 88. Interference surface 88 is angled at a very small angle. The outer pressure sleeve 84 and the inner pressure sleeve 86 are pressed together when the pump 12 is assembled and the socket head cap screws 40 are tightened into the fluid cylinder 68. By fully assembling the pressure sleeve 62 during construction of the pump 12, the inner pressure sleeve 86 is properly seated within the outer pressure sleeve 84. A flange 90 extends from the outer pressure sleeve 84 to engage the frame plate 68 and fit within the inner diameter of flange 64. Accordingly, an extremely rigid assembly is provided which transfers the internal pressure from the fluid through the components and into the frame plate 68.

Figure 7:
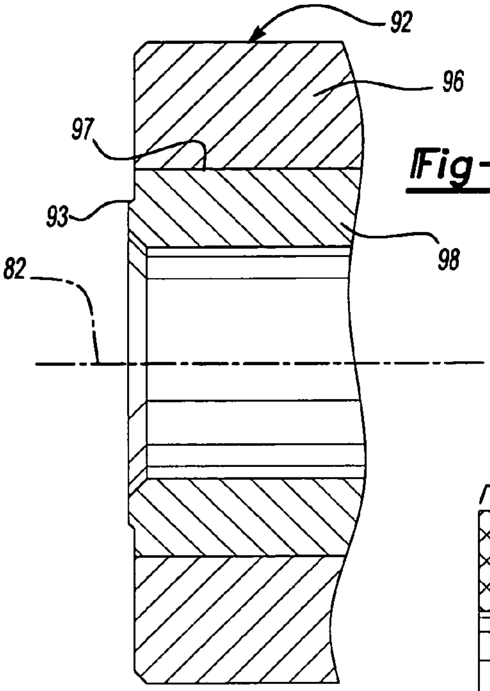
FIG. 7 is an exploded sectional view of a seal cartridge assembly of the fluid cylinder pump illustrated in FIG. 2.

A seal cartridge assembly 92 caps the fluid pumping chamber 94 and is retained between the pressure sleeve assembly 62 and the flange plate 42. The seal cartridge assembly 92 includes an outer seal cartridge 96 and an inner seal cartridge 98. The inner seal cartridge 98 further includes an integral annular ring 93 (FIG. 7) that engages both the pressure sleeve assembly 62 as well as the flange 42. The integral annular ring 93 localizes the engagement area between the seal cartridge assembly 92 and the pressure sleeve assembly 62 to improve the seal therebetween. The seal cartridge assembly 92 also engages with the flange 42. Preferably substantially aligned with localized engagement area to safely direct any escaping fluid from between the components.

Notably the corners of the pressure sleeve assembly 62 are radiused. Radiuses are also extensively provided on the valve seat assembly 46, the seal cartridge assembly 92 and other areas pressure bearing components, interfaces, ports, passages, bores and to reduce the likelihood of stress concentrations at a sharp corner.

An interference surface 97 between the outer seal cartridge 96 and the inner seal cartridge 98 is substantially parallel to the pump centerline 82. Preferably, the outer seal cartridge 96 and an inner seal cartridge 98 are manufactured to have an interference fit that necessitates the outer seal cartridge 96 being heated prior to the inner seal cartridge 98 being assembled into the outer seal cartridge 96. In an assembled condition, the inner seal cartridge 98 is thereby retained under compressive stress by the outer seal cartridge 96.

Figure 8:
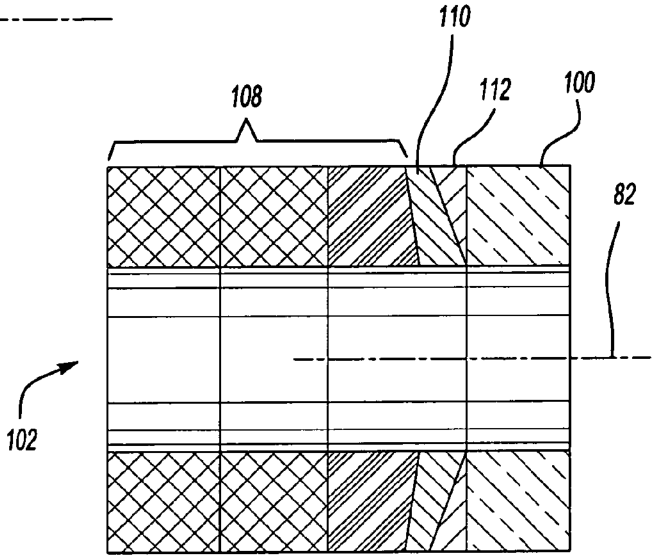
FIG. 8 is an exploded view of a packing assembly of the fluid cylinder pump illustrated in FIG. 2.

The inner seal cartridge 98 retains a back-up ring 100, a packing assembly 102, a bushing 104, a spring sleeve 106, and a packing spring 109. The packing assembly 102 seals the fluid pumping chamber 94 and cycles between atmospheric pressure and maximum pump 12 pressure. The packing assembly 102 includes a multiple of non-metallic packing materials 108, an ID wedge ring 110, and an OD wedge ring 112 (FIG. 8). The non-metallic packing materials 108 are preferably square in cross section. When the packing assembly 102 is under pressure the ID wedge ring 110 moves toward the centerline 82 and the OD wedge ring 112 moves away from the centerline 82.

Packing spring 109 engages the pressure sleeve assembly 62 and biases the packing assembly 102 to maintain the packaging assembly under pressure independent of the pump cycle. Further, the packing spring 109 assures that the non-metallic packing materials 108 are pressed against the inner surface of the inner seal cartridge 98. Accordingly, an effective end seal is provided under the cyclical pressure.

Plunger 26 is stroked every 120 degree turn of a crank (not shown) within the power frame 12 (i.e., when number 1 is on the discharge stroke, number 3.is on the suction stroke and number 2 is in between). Once a plunger 36 reaches its full outward position, its fluid is pumping chamber 94 is filled with fluid and the suction valve 74 checks closed under the bias of spring 76. The plunger 26 is now driven into the fluid pumping chambers 94. The plunger 26 begins to displace volume with fluid pumping chamber 94 and the fluid is forced into smaller and smaller area. The pressure within the pump 12 thereby begins to increase and the pressure is carried by the components out to the frame plates 68. The plungers 26 continue reciprocating into the fluid pumping chambers 94 until each plunger 26 reaches a full disclosure position (illustrated by cross-hatchings) within fluid pumping chamber 94.

Figure 9A:
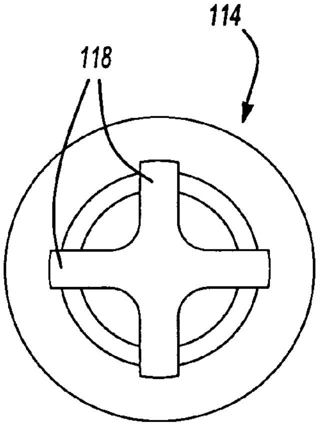
FIG. 9A is a front exploded view of a discharge valve of the fluid cylinder pump illustrated in FIG. 2.
Figure 9B:
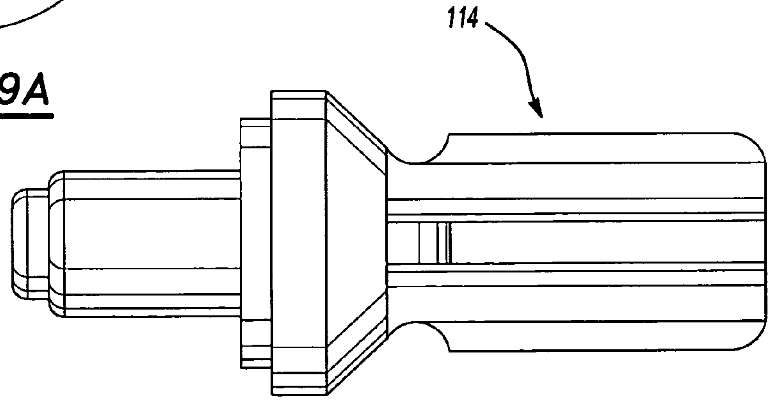
FIG. 9B is a side exploded view of a discharge valve of the fluid cylinder pump illustrated in FIG. 2.

When the pressure within the fluid pumping chambers 94 reaches a predetermined pressure, a discharge valve 114 overcomes a discharge spring 116 and water pressure within discharge passage 36. The discharge valve 114 is preferably relatively light in weight and includes a multiple of wing guides 118 (FIG. 9) which reduce the likelihood of cocking as fluid exits the fluid pumping chambers 94 and enters the manifold 28. The fluid exits through the discharge passage 36 and the discharge port 32 and travels out to the gun 18 (FIG. 1).

The plunger 26 will then reciprocate out of the fluid pumping chambers 94 and the cycle repeats. Accordingly, an extremely high pressure fluid assembly is provided in a compact package.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A high pressure fluid jetting system comprising:
- a frame plate which defines a fluid pumping chamber; and
- a pressure assembly within said frame plate said pressure assembly comprising an outer pressure sleeve and an inner pressure sleeve having an angled interference surface therebetween;
- a plunger reciprocally movable within said inner pressure sleeve of said pressure assembly;
- a seal cartridge assembly pressed into said fluid pumping chamber of said frame plate, the seal cartridge assembly located adjacent said pressure assembly wherein said seal cartridge assembly comprises:
  - an inner seal cartridge, and an outer seal cartridge having an angled interference surface therebetween; and
  - a packing assembly within said inner seal cartridge.

2. The assembly as recited in claim 1, wherein said pressure assembly operates at approximately 50,000 pounds per square inch of pressure.

3. The system as recited in claim 1, wherein said inner seal cartridge is maintained in compression by said outer seal cartridge.

4. The system as recited in claim 1, wherein said inner seal cartridge defines an outer diameter less than an outer diameter of said inner pressure sleeve.

5. The system as recited in claim 1, wherein said angled interference surface between said inner seal cartridge and said outer seal cartridge abuts an end of said inner pressure sleeve and a flange plate.

6. The system as recited in claim 5, further comprising a manifold adjacent said frame plate, said manifold mounted to said flange plate through a multitude of fasteners which pass through said frame plate.

7. The system as recited in claim 1, wherein said outer pressure sleeve includes a radially extending flange which abuts said frame plate.

8. A high pressure fluid jetting system comprising:
- a frame plate having a fluid pumping chamber;
- a pressure assembly within said frame plate comprising an outer pressure member and an inner pressure member having an angled interference surface therebetween;
- a seal cartridge assembly at least partially within said frame plate, said seal cartridge assembly comprising an outer seal cartridge and an inner seal cartridge, said inner seal cartridge and said outer seal cartridge having an angled seal cartridge interference surface therebetween, said seal cartridge assembly located adjacent said pressure assembly;
- a plunger reciprocally movable within said pressure assembly and said seal assembly; and
- a valve seat assembly adjacent said pressure assembly.

9. The system as recited in claim 8, wherein said angled interference surface between said inner seal cartridge and said outer seal cartridge abuts an end of said inner pressure sleeve and a flange plate.

10. The system as recited in claim 9, further comprising a manifold adjacent said frame plate, said manifold mounted to said flange plate through a multitude of fasteners which pass through said frame plate.

11. The system as recited in claim 10, wherein said manifold engages said valve seat assembly.

12. The system as recited in claim 8, wherein said valve seat assembly includes an outer valve seat and an inner valve seat, said outer surface of the inner valve seat and an inner surface of said outer valve seat form a valve seat interference surface which maintains said inner valve seat in internal compressive stress.

* * * * *